(12) United States Patent
Suzuki

(10) Patent No.: US 11,667,158 B2
(45) Date of Patent: Jun. 6, 2023

(54) PNEUMATIC TIRE

(71) Applicant: The Yokohama Rubber Co., LTD., Tokyo (JP)

(72) Inventor: Yuhei Suzuki, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 745 days.

(21) Appl. No.: 16/491,543

(22) PCT Filed: Mar. 5, 2018

(86) PCT No.: PCT/JP2018/008391
§ 371 (c)(1),
(2) Date: Sep. 5, 2019

(87) PCT Pub. No.: WO2018/164071
PCT Pub. Date: Sep. 13, 2018

(65) Prior Publication Data
US 2020/0009919 A1    Jan. 9, 2020

(30) Foreign Application Priority Data
Mar. 6, 2017   (JP) .............................. JP2017-041924

(51) Int. Cl.
*B60C 11/11*    (2006.01)
*B60C 11/12*    (2006.01)

(52) U.S. Cl.
CPC .......... *B60C 11/11* (2013.01); *B60C 11/1204* (2013.01); *B60C 11/1236* (2013.01); *B60C 2200/14* (2013.01)

(58) Field of Classification Search
CPC . B60C 11/11; B60C 11/1204; B60C 11/1236; B60C 2011/0381; B60C 2011/1209; B60C 2200/14
See application file for complete search history.

(56) References Cited

U.S. PATENT DOCUMENTS

D811,320 S * 2/2018 Kuwahara .................... D12/602
2003/0041939 A1 3/2003 Allison et al.
(Continued)

FOREIGN PATENT DOCUMENTS

JP   2014-121916   7/2014
JP   2015-223884   12/2015
(Continued)

OTHER PUBLICATIONS

International Search Report for International Application No. PCT/JP2018/008391 dated Jun. 5, 2018, 3 pages, Japan.

*Primary Examiner* — Katelyn W Smith
*Assistant Examiner* — Philip N Schwartz
(74) *Attorney, Agent, or Firm* — Thorpe North & Western

(57) ABSTRACT

In a pneumatic tire, center blocks in a center region of a tread portion form a pair sandwiching an inclined groove that extends inclined with respect to a circumferential direction. Each of the center blocks extends across an equator and includes a notch formed of first and second walls that are connected in a V-shape in a tread road contact surface. The first wall extends within +/−20° with respect to the circumferential direction, and the second wall extends within +/−10° with respect to a lateral direction. Each of shoulder blocks provided in a center region of the tread portion includes a third wall opposed to the notch and at an angle within +/−5° with respect to a straight line connecting an end point of the first wall, located adjacent to the shoulder block and an end point of the second wall, located adjacent to the shoulder block.

10 Claims, 5 Drawing Sheets

(56) References Cited

U.S. PATENT DOCUMENTS

2005/0103416 A1    5/2005  Rooney et al.
2015/0336430 A1*  11/2015  Sueyoshi ................ B60C 11/11
                                                    152/209.24
2017/0120687 A1*   5/2017  Okawara ............. B60C 11/1315

FOREIGN PATENT DOCUMENTS

JP      2016-222207     12/2016
JP      2017-081439      5/2017
WO    WO 03/020538      3/2003

* cited by examiner

PNEUMATIC TIRE

TECHNICAL FIELD

The present technology relates to a pneumatic tire suitable as a tire for driving on unpaved roads and, in particular, to a pneumatic tire that can provide improved driving performance on unpaved roads.

BACKGROUND ART

Pneumatic tires used for driving on unpaved roads such as an irregular ground, a mud land, a snowy road, a sand area, and a rocky area are provided with a tread pattern mainly including lug grooves or blocks that have many edge components, and the tread pattern having grooves, the area of which is large is generally employed. Such a tire obtains traction characteristics by engagement with mud, snow, sand, stones, rocks, or the like on a road surface (hereinafter, referred to collectively as "mud or the like") and prevents the grooves from being clogged with mud or the like, and thus driving performance on unpaved roads is improved (for example, see Japan Unexamined Patent Publication No. 2015-223884). However, even with such a tire, driving performance on unpaved roads (in particular, traction characteristics and starting performance) is not always sufficiently obtained, and the tire requires further improvement.

SUMMARY

The present technology provides a pneumatic tire that is suitable as a tire for driving on unpaved roads and provides improved driving performance on unpaved roads.

A pneumatic tire according to an embodiment of the present technology includes: a tread portion extending in a tire circumferential direction and having an annular shape; a pair of sidewall portions disposed on opposite sides of the tread portion; and a pair of bead portions disposed inward of the sidewall portions in a tire radial direction, wherein a plurality of center blocks are provided in a center region of the tread portion and a plurality of shoulder blocks are provided in shoulder regions of the tread portion. The center blocks are arranged forming a pair sandwiching an inclined groove that extends inclined with respect to the tire circumferential direction. One of the pair of the center blocks extends across a tire equator from one side to another side of the tire equator and another of the pair of the center blocks extends across the tire equator from the other side to the one side of the tire equator. Each of the center blocks includes a notch formed of two wall surfaces connected in a V-shape in a tread road contact surface. The two wall surfaces include, in the tread contact surface, a first wall that extends at an angle within +/−20° with respect to the tire circumferential direction and a second wall that extends at an angle within +/−10° with respect to a tire lateral direction. Each of the shoulder blocks includes a third wall disposed opposed to the notch of the center block. The third wall extends at an angle within +/−5° with respect to a straight line connecting an end point P1 of the first wall, which is located adjacent to the shoulder block and an end point P2 of the second wall, which is located adjacent to the shoulder block.

In the present technology, as described above, the center blocks extend across the tire equator. Thus, edge components of the center blocks in the tire lateral direction can be increased, and driving performance (for example, mud performance or the like) on unpaved roads can be increased. In addition, each of the center blocks is provided with the notch, and thus mud or the like in grooves can be effectively gripped by the notch. Consequently, driving performance (for example, mud performance or the like) on unpaved roads can be increased. In particular, since the extension directions of the first wall and the second wall are set to the above-described angles, advantageously, side slipping of the tire is inhibited by the first wall and traction characteristics are increased by the second wall. Further, the third wall located opposed to the notch is provided as described above. Accordingly, the third wall can provide resistance to mud or the like likely to flow out of the notch, and thus shear force is increased. In addition, since the third wall extends substantially in parallel to the opening of the notch, mud or the like can be appropriately discharged. Consequently, driving performance (for example, mud performance or the like) on unpaved roads can be increased.

In the present technology, the third wall preferably has a length that is from 0.3 times to 0.8 times a distance between the end point P1 of the first wall, which is located adjacent to the shoulder block and the end point P2 of the second wall, which is located adjacent to the shoulder block. As just described, the third wall is set to an appropriate size with respect to the opening of the notch, and thus the effect of increasing shear force by the third wall and the efficiency of discharging mud or the like are advantageously achieved in a well-balanced manner.

In the present technology, the third wall preferably overlaps with a midpoint of a line segment connecting an intersection point p1 of an extended line of the first wall with an extended line of the third wall and an intersection point p2 of an extended line of the second wall with an extended line of the third wall. As just described, the third wall is arranged, and thus the position of the third wall with respect to the opening of the notch is optimized. Accordingly, shear force is advantageously increased by the third wall.

In the present technology, a distance between the third wall and a line segment connecting the end point P1 of the first wall, which is located adjacent to the shoulder block and the end point P2 of the second wall, which is located adjacent to the shoulder block is preferably smaller than a distance between the line segment connecting the end point P1 of the first wall, which is located adjacent to the shoulder block and the end point P2 of the second wall, which is located adjacent to the shoulder block and an intersection point P3 of the first wall and the second wall. Accordingly, a good balance between the interval between the center block and the shoulder block (a groove width of a groove formed between the center block and the shoulder block) and the size of the notch is provided. Thus, the effect of increasing shear force by the third wall and the efficiency of discharging mud or the like are advantageously achieved in a well-balanced manner.

In the present technology, the third wall preferably has a wall surface angle of from 80° to 90°. As just described, the wall surface angle of the third wall is set, and thus the effect of increasing shear force by the third wall and the efficiency of discharging mud or the like are advantageously achieved in a well-balanced manner. Note that the wall surface angle of the third wall is an angle with respect to a groove bottom of the groove formed between the center block and the shoulder block.

In the present technology, of wall surfaces configuring the shoulder block, an inclination direction in the tread road contact surface of the wall surfaces which are connected to the third wall is preferably opposite to an inclination direction of the inclined groove. Thus, of the wall surfaces configuring the shoulder block, the wall surface connected to the third wall configures the groove, and a portion of mud or the like in the groove and a portion of mud or the like in the inclined groove easily flow into the notch. Accordingly, mud or the like within the notch is compressed and shear force is easily obtained. As a result, driving performance (for example, mud performance or the like) on unpaved roads is advantageously improved.

In the present technology, various dimensions (lengths or angles) have values measured when a regular load is applied to the tire in a state where the tire mounted on a regular rim and inflated to a regular internal pressure is placed vertically on a flat surface. "Length" is the length in the tread road contact surface unless otherwise specified. In the aforementioned state of the tire, "road contact surface" of each of the blocks is the surface portion of each block actually contactable with the flat surface on which the tire is placed, and does not include a surface, such as a chamfered portion, which is actually not contactable with the flat surface. Additionally, in the aforementioned state of the tire, "ground contact edges" are referred to as opposite ends in the tire axial direction. "Regular rim" is a rim defined by a standard for each tire according to a system of standards that includes standards on which tires are based, and refers to a "standard rim" in the case of JATMA (The Japan Automobile Tyre Manufacturers Association, Inc.), refers to a "design rim" in the case of TRA (The Tire & Rim Association, Inc.), and refers to a "measuring rim" in the case of ETRTO (The European Tyre and Rim Technical Organisation). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle. "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO. "Regular load" corresponds to 88% of the loads described above for a tire on a passenger vehicle.

DETAILED DESCRIPTION

Configurations of embodiments of the present technology will be described in detail below with reference to the accompanying drawings.

Figure 1:
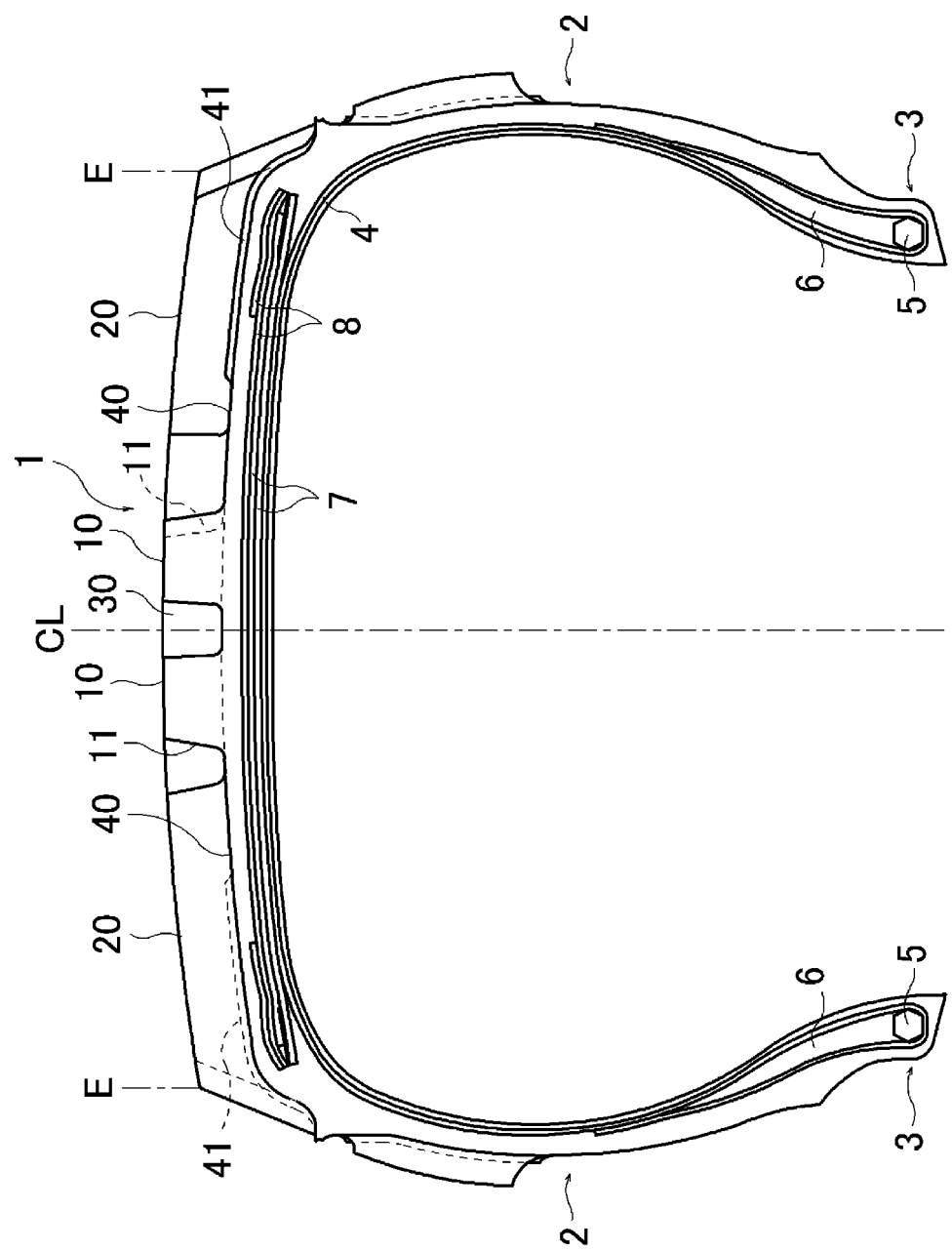
FIG. 1 is a meridian cross-sectional view of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction. Note that in FIG. 1, the tire equator is denoted by "CL" and the ground contact edge is denoted by "E".

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. Also, in the tread portion 1, a plurality of belt layers 7 (two layers in FIG. 1) are embedded on the outer circumferential side of the carcass layer 4. The belt layers 7 each include a plurality of reinforcing cords that are inclined with respect to the tire circumferential direction, with the reinforcing cords of the different layers arranged in a crisscross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a general pneumatic tire, however, the cross-sectional structure thereof is not limited to the basic structure described above.

Figure 2:
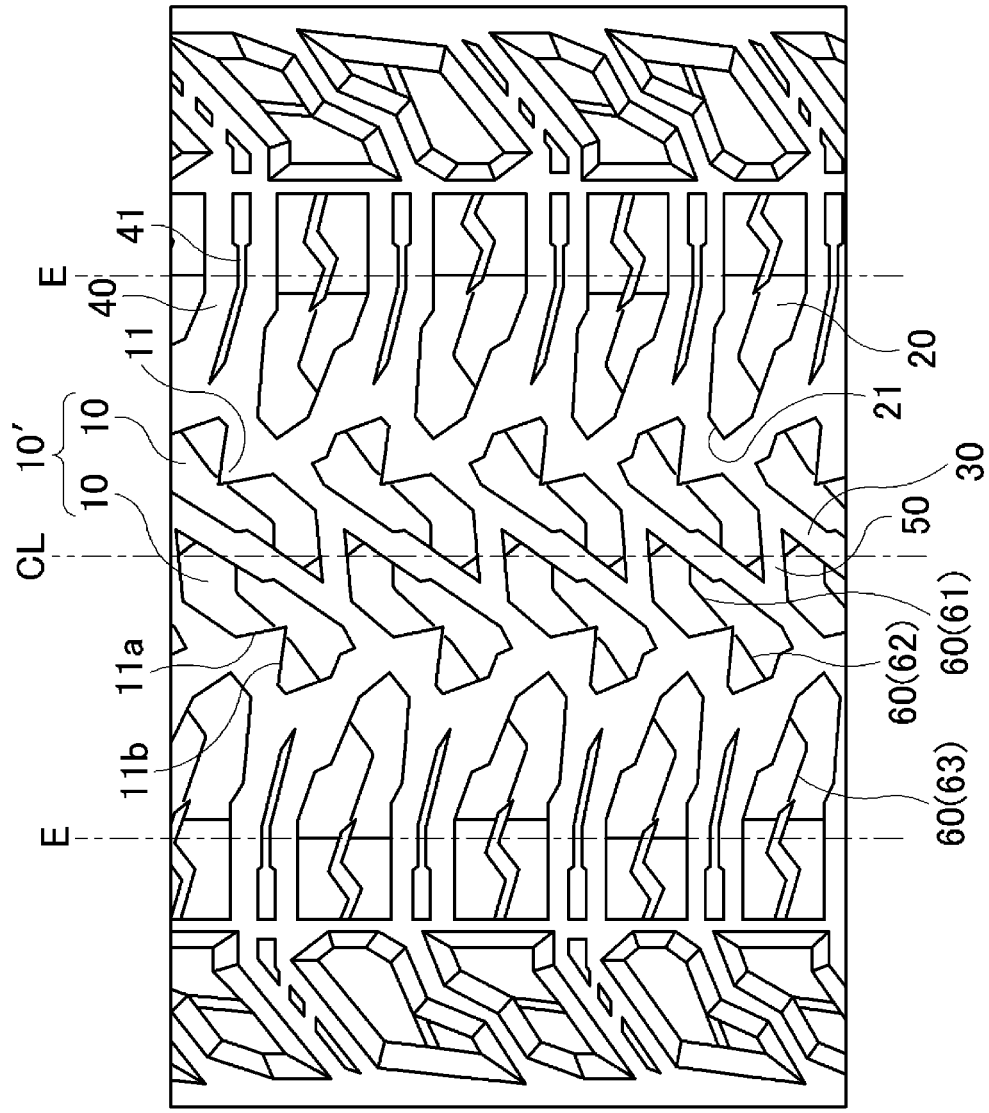
FIG. 2 is a front view illustrating a tread surface of the pneumatic tire according to an embodiment of the present technology.

As illustrated in FIGS. 1 and 2, a plurality of center blocks 10 are provided in a center region on an outer surface of the tread portion 1.

Additionally, a plurality of shoulder blocks 20 are provided in shoulder regions of the outer surface of the tread portion 1. In other words, two types of blocks (the center blocks 10 and the shoulder blocks 20) are provided on the opposite sides of the tire equator on the outer surface of the tread portion 1. The center blocks 10 are disposed on the tire equator side (in the center region), and the shoulder blocks 20 are disposed outward of the center blocks 10 in the tire lateral direction (in the shoulder regions).

The center blocks 10 are arranged so as to form a pair (a block pair 10') while sandwiching an inclined groove 30 that extends at an inclination with respect to the tire circumferential direction. In addition, the center block 10 on one side of the block pair 10' (on the left side of the tire equator in the drawing) extends to run across the tire equator from one side (the left side of the tire equator in the drawing) to the other side (the right side of the tire equator in the figure) of the tire equator. The center block 10 on the other side (the right side of the tire equator in the drawing) extends to run across the tire equator from the other side (the right side of the tire equator in the drawing) to one side (the left side of the tire equator in the drawing) of the tire equator.

Figure 3:
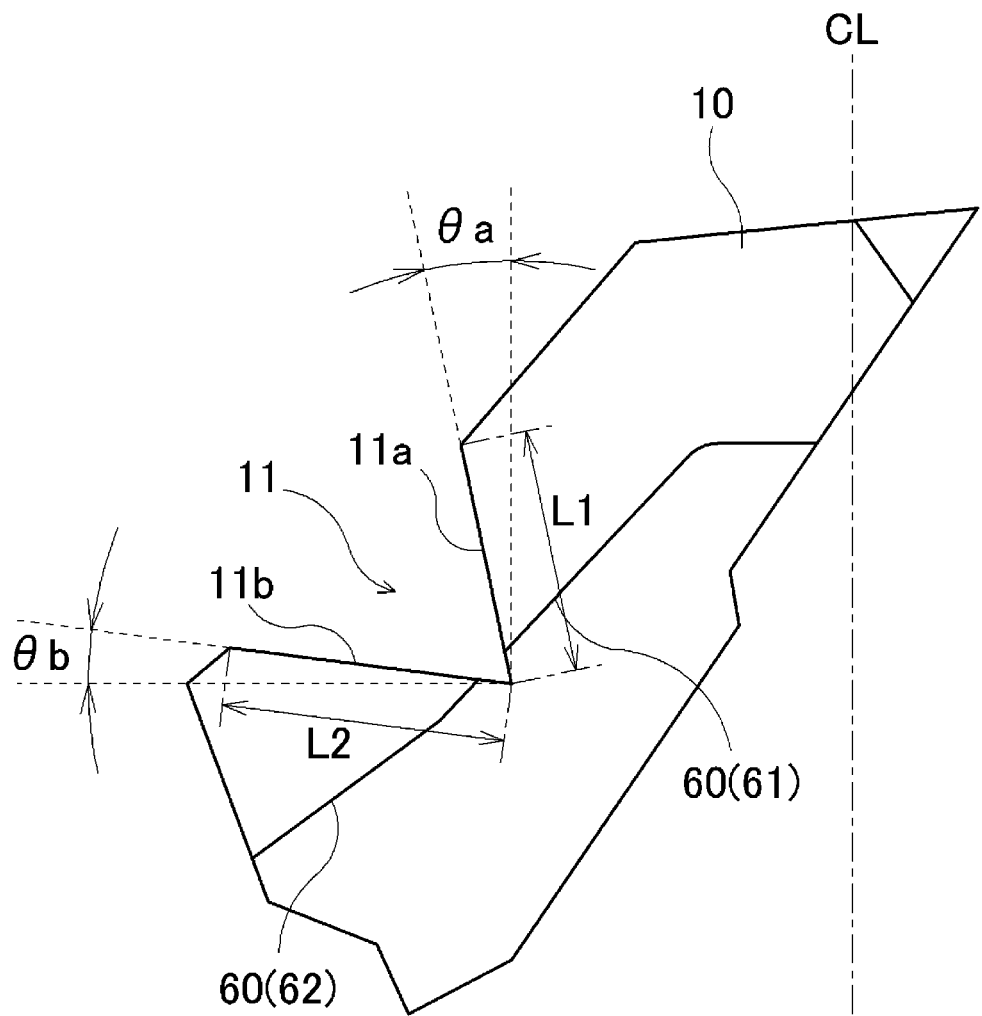
FIG. 3 is an enlarged front view of a center block of FIG. 2.

As illustrated in an enlarged view of FIG. 3, a notch 11 formed of two wall surfaces (a first wall 11a and a second wall 11b) connected in a V-shape in a tread road contact surface is provided on a wall surface (wall surface on the opposite side of the inclined groove 30) of each of the center blocks 10, which is located outward in the tire lateral direction. The first wall 11a extends at an angle within +/−20° with respect to the tire circumferential direction in the tread road contact surface, and the second wall 11b extends at an angle within +/−10° with respect to the tire lateral direction. In other words, in the tread contact surface, an angle θa formed by the first wall 11a with respect to the tire circumferential direction is within +/−20°, and an angle θb formed by the second wall 11b with respect to the tire lateral direction is within +/−10°.

The shape of the shoulder block 20 is not particularly limited as long as the shoulder block 20 is a block disposed outward of the center block 10 in the tire lateral direction. However, the shoulder block 20 always includes a third wall 21 disposed opposed to the notch 11 of the center block 10. The third wall 21 extends substantially in parallel to an opening of the notch 11, and specifically, extends at an angle within +/−5° with respect to a straight line A connecting an end point P1 of the first wall 11a, which is located adjacent to the shoulder block 20 and an end point P2 of the second wall 11b, which is located adjacent to the shoulder block 20.

As just described, the center blocks 10 are provided so as to form a block pair 10', and each of the center blocks 10 extends to run across the tire equator CL. Thus, edge components of the center blocks 10 in the tire lateral direction can be increased, and driving performance (for example, mud performance or the like) on unpaved roads can be increased. In addition, each of the center blocks 10 is provided with the notch 11, and mud or the like in grooves can be effectively gripped by the notch 11. This also can increase driving performance (for example, mud performance or the like) on unpaved roads. In particular, since the extension directions of the first wall 11a and the second wall 11b are set as the angles described above, side slipping of the tire can be inhibited by the first wall 11a and traction characteristics can be increased by the second wall 11b. Thus, driving performance on unpaved roads is advantageously enhanced. Further, the shoulder block 20 is provided with the third wall 21 disposed opposed to the notch 11 as described above. Accordingly, the third wall 21 provides resistance to mud or the like that is likely to flow out of the notch 11, and thus shear force can be increased. Meanwhile, since the third wall 21 extends substantially in parallel to the opening of the notch 11, mud or the like can be discharged appropriately. The configuration as just described works synergistically, and thus can effectively enhance driving performance (for example, mud performance or the like) on unpaved roads.

In a case where the center blocks 10 are shaped so as not to extend beyond the tire equator, the edge components of the center blocks 10 in the tire lateral direction cannot be sufficiently ensured. Consequently, driving performance on unpaved roads cannot be increased. In a case where the angle θa of the first wall 11a is out of a range within +/−20° with respect to the tire circumferential direction, the extension direction of the first wall 11a in the tread contact surface is excessively inclined with respect to the tire circumferential direction. As a result, the edge effect by the first wall 11a is not obtained sufficiently, and side slipping of the tire cannot be sufficiently inhibited. In a case where the angle θb of the second wall 11b is out of a range within +/−10° with respect to the tire lateral direction, the extension direction of the second wall 11b in the tread contact surface is excessively inclined with respect to the tire lateral direction. As a result, the edge effect by the second wall 11b is not obtained sufficiently, and traction characteristics cannot be sufficiently increased. In a case where the wall surface angles of the first wall 11a and the second wall 11b are smaller than the wall surface angle of the wall surface provided with the notch 11, it is difficult to ensure sufficient block rigidity. In a case where the shoulder block 20 does not include the third wall 21, the effect by the third wall 21 (the effect of increasing shear force by providing resistance to mud or the like likely to flow out of the notch 11) cannot be expected. If the angle of the third wall 21 is out of a range within +/−5° with respect to the straight line A, one end of the third wall 21 is disposed too close to the center block 10 (the notch 11). As a result, mud or the like is inhibited from being discharged appropriately.

Figure 4:
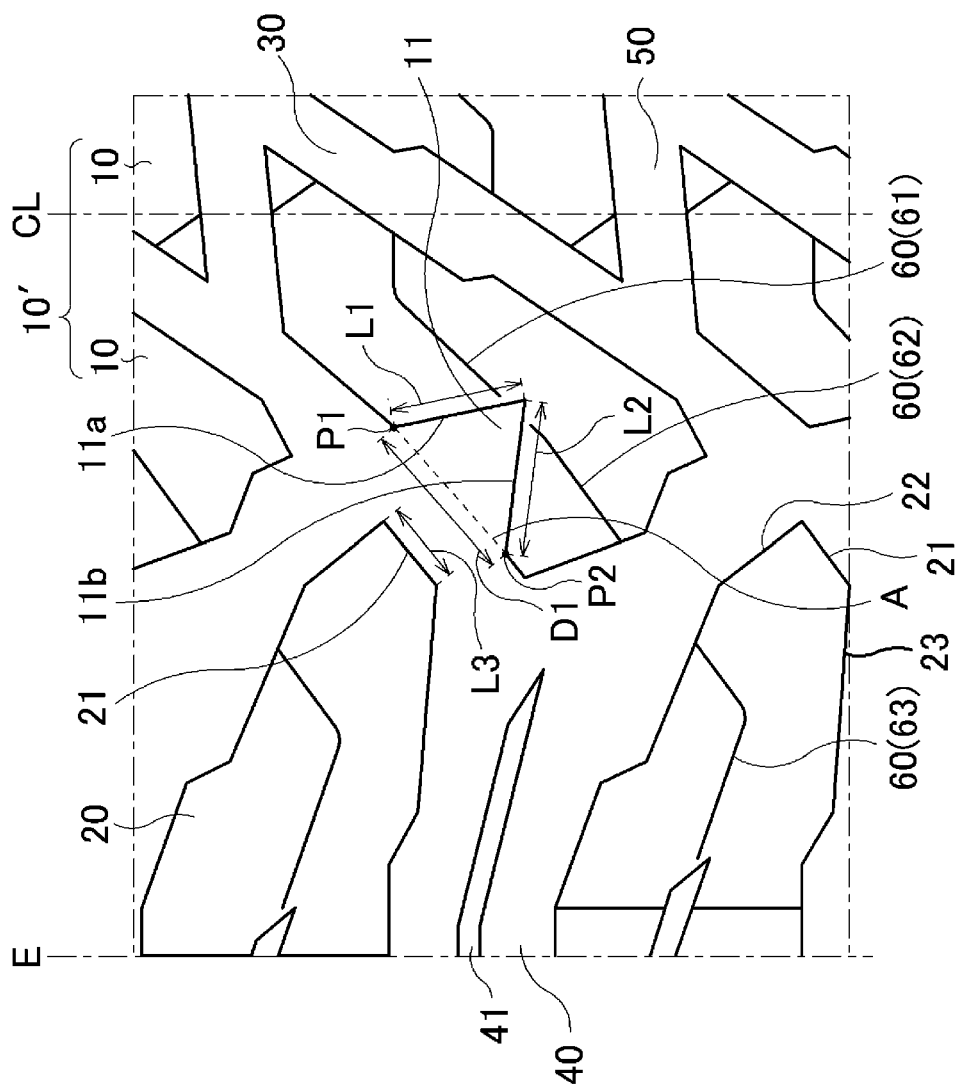
FIG. 4 is an enlarged front view illustrating a portion of center blocks and shoulder blocks of FIG. 2.

For the third wall 21 to provide resistance to mud or the like flowing out of the notch 11 as described above, the third wall 21 preferably has an appropriate size with respect to the opening of the notch 11. Specifically, as illustrated in FIG. 4, the third wall 21 preferably has a length L3 set to be from 0.3 times to 0.8 times a distance D1 between the end point P1 of the first wall 11a, which is located adjacent to the shoulder block 20 and the end point P2 of the second wall 11b, which is located adjacent to the shoulder block 20. With the dimension setting as just described, the third wall 21 has an appropriate size with respect to the opening of the notch 11, and thus, advantageously, the effect of increasing shear force by the third wall 21 and the efficiency of discharging mud or the like are provided in a well-balanced manner. In a case where the length L3 of the third wall 21 is less than 0.3 times the distance D1, it is difficult to provide sufficient resistance to mud or the like that is likely to flow out the notch 11. In a case where the length L3 of the third wall 21 is greater than 0.8 times the distance D1, the third wall 21 is in a form that substantially blocks the notch 11, and thus it is difficult to obtain the sufficient efficiency of discharging mud or the like.

Note that a length L1 of the first wall 11a and a length L2 of the second wall 11b are not particularly limited as long as the distance D1 relating to the notch 11 satisfies the aforementioned relationship with the length L3 of the third wall 21. However, in view of achieving in a well-balanced manner inhibition of side slipping by the first wall 11a and improvement of traction characteristics by the second wall 11b, the length L2 of the second wall 11b is preferably set to be from 0.5 times to 2.0 times, and more preferably from 1.1 times to 2.0 times the length L1 of the first wall 11a.

Figure 5:
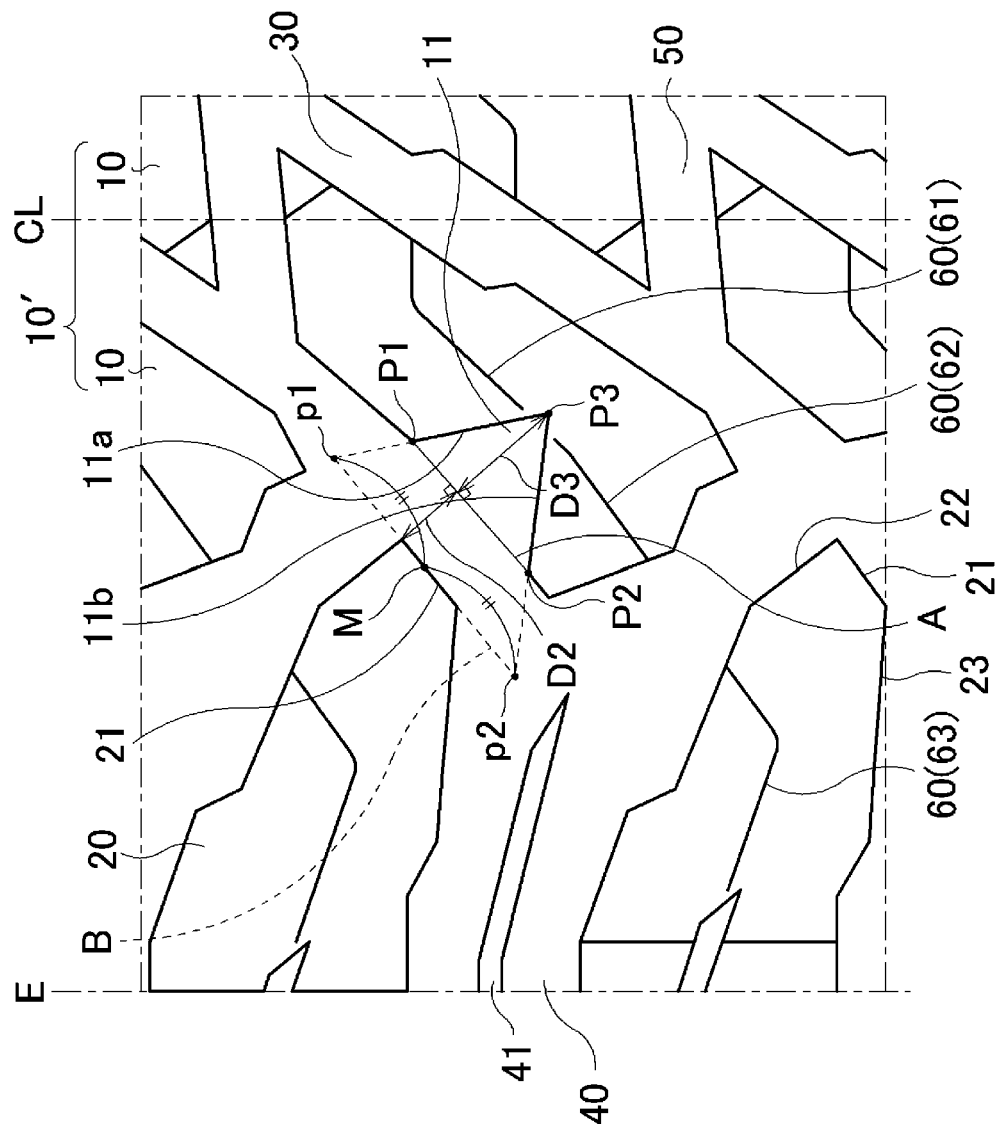
FIG. 5 is an explanatory diagram illustrating a positional relationship between a notch and a third wall.

In order that the effect of increasing shear force is successively exerted by the third wall 21, the positional relationship between the third wall 21 and the opening of the notch 11 is important. Accordingly, as illustrated in FIG. 5, the third wall 21 preferably overlaps with a midpoint M of a line segment B connecting an intersection point p1 of an extended line of the first wall 11a with an extended line of the third wall 21 and an intersection point p2 of an extended line of the second wall 11b with an extended line of the third wall 21. Thus, the third wall 21 is disposed opposed to the opening of the notch 11 so as to be overlapped with the opening of the notch 11. Consequently, the positional relationship between the third wall 21 and the opening of the notch 11 is optimized, and shear force can be effectively increased by the third wall 21. When the third wall 21 does not overlap with the midpoint M of the line segment B, the third wall 21 is disposed without being overlapped with the opening of the notch 11. Consequently, it is difficult to provide sufficient resistance to mud or the like that is likely to flow out of the notch 11.

Since the center blocks 10 and the shoulder blocks 20 are blocks that are mutually independent, grooves are formed therebetween. At this time, the groove formed between the notch 11 of the center block 10 and the third wall 21 of the shoulder block 20 has an appropriate groove width, and thus, advantageously, the effect of increasing shear force by the third wall and the efficiency of discharging mud or the like are provided in a well-balanced manner. Thus, a distance D2 between the third wall 21 and a line segment A connecting the end point P1 of the first wall 11a, which is located adjacent to the shoulder block 20 and the end point P2 of the second wall 11b, which is located adjacent to the shoulder block 20 is preferably shorter than a distance D3 between an intersection point P3 of the first wall 11a and the second wall 11b and the line segment A. In particular, the distance D2 is preferably from 0.4 times to 0.8 times the distance D3. In a case where the distance D2 is less than 0.4 times the distance D3, the third wall 21 is disposed too close to the center block 10 (the notch 11). Consequently, it is difficult to obtain the sufficient efficiency of discharging mud or the like. In a case where the distance D2 is greater than 0.8 times the distance D3, the third wall 21 is largely separated from the center block 10 (the notch 11). Consequently, it is difficult to allow the third wall 21 to provide sufficient resistance to mud or the like that is likely to flow out of the notch 11.

Since the third wall 21 has a role to provide resistance to mud or the like likely to flow out of the notch 11 as described above, the third wall 21 is preferably substantially perpendicular to the groove bottom. Accordingly, the wall surface angle of the third wall 21 is preferably set to from 80° to 90°. In a case where the wall surface angle of the third wall 21 is less than 80°, it is difficult to ensure the groove volume, and it is difficult to ensure a sufficient shear force. In a case where the wall surface angle of the third wall 21 is greater than 90°, mud or the like is not easily discharged. Additionally, it is difficult to allow the third wall 21 to provide sufficient resistance to mud or the like that is likely to flow out the notch 11.

The wall angles of the first wall 11a and the second wall 11b that configure the notch 11 are not particularly limited to the aforementioned wall surface angle of the third wall 21. The wall surface angle of the first wall 11a can be set, for example, to from 5° to 20°, and the groove wall angle of the second wall 11b can be set, for example, to from 5° to 20°.

As long as the shoulder block 20 has the third wall 21 as described above, the shape of the shoulder block 20 is not particularly limited. Of wall surfaces configuring the shoulder block 20, the direction of inclination of wall surfaces 22, 23 connected to the third wall 21 is preferably opposite to the direction of inclination of the inclined groove 30 in the tread contact surface. Accordingly, of the wall surfaces configuring the shoulder block 20, the wall surfaces 22, 23 connected to the third wall 21 forms a groove, and the groove (in the illustrated example, an end portion adjacent to the notch 11 of a shoulder inclined groove 40 formed between the shoulder blocks 20 located side by side in the tire circumferential direction) is inclined so as to extend toward the notch 11. Thus, a portion of mud or the like in the groove easily flows into the notch 11. As a result, mud or the like in the notch 11 is compressed and shear force is easily obtained, and thus driving performance (for example, mud performance or the like) on unpaved roads is advantageously enhanced.

As described above, the shoulder inclined groove 40 is formed between the shoulder blocks 20 located side by side in the tire circumferential direction. However, in order to increase the efficiency of discharging mud or the like in the groove therefrom, the groove width of the shoulder inclined groove 40 preferably increases toward the tire equator CL as illustrated in the drawings. Additionally, as illustrated in the drawings, a groove bottom protrusion 41 is preferably formed at the shoulder inclined groove 40. The groove bottom protrusion 41 protruding from the groove bottom is located in the center in the groove width direction of the shoulder inclined groove 40. The protrusion height of the groove bottom protrusion 41 can be set, for example, to from 10% to 25% of the groove depth of the shoulder inclined groove 40. The width of the groove bottom protrusion 41 can be set to from 5% to 20% of the groove width of the shoulder inclined groove 40. Such a groove bottom protrusion 41 serves to avoid clogging of mud or the like to the groove bottom of the shoulder inclined groove 40, and also serves to help mud or the like discharged by vibrations of the groove bottom protrusion 41 when the vehicle is traveling. The groove bottom protrusion 41 preferably extends outward in the tire lateral direction beyond an outer edge of the shoulder block 20, that is, the edge of the road contact surface of the shoulder block 20 on the outer side in the tire lateral direction (the edge formed by the road contact surface of the shoulder block 20 and the side surface of the shoulder block 20 on the outer side in the tire lateral direction). The groove bottom protrusion 41 is provided in this manner, and thus mud or the like in the shoulder inclined groove 40 can be effectively and easily discharged.

The inclined groove 30 sandwiched between the two center blocks 10 configuring the block pair 10' may extend with a constant width. Alternatively, as in the illustrated example, the wall surface of the center block 10, which is located at the inclined groove 30 is bent in the tread contact surface, and thus a wide portion having a groove width greater than those of other portions of the inclined groove 30 may be provided halfway in the extension direction of the inclined groove 30 (in the illustrated example, at a portion overlapped with the tire equator CL). Such a wide portion is provided, and thus mud or the like in the wide portion are pressed and hardened when the vehicle is traveling and shear force is obtained. Consequently, driving performance on unpaved roads is advantageously improved.

In the center region, the plural block pairs 10' are arranged at intervals in the tire circumferential direction, and thus grooves are formed between the block pairs 10' located side by side in the tire circumferential direction. However, as illustrated in the drawings, a connection groove 50 connecting the inclined grooves 30 located side by side in the tire circumferential direction is preferably provided. In particular, the connection groove 50 preferably extends in the tread contact surface at an angle within +/−10° with respect to the tire lateral direction. Additionally, the connection groove 50 is preferably provided at a position intersecting with the tire equator CL. The connection groove 50 is provided in this manner, and thus traction characteristics can be further improved by the connection groove 50.

As described above, the tread portion 1 of the present technology always includes the center block 10 and the shoulder block 20. However, at least one end of any of the blocks is preferably provided with a sipe 60 connected to the groove (the inclined groove 30, the shoulder inclined groove 40, the connection groove 50, or the like). Additionally, an end of the sipe 60, which is connected to the groove (the inclined groove 30, the shoulder inclined groove 30, the connection groove 50, or the like) has a shallow sipe depth. For example, in the illustrated example, the center block 10 is provided with a sipe 61, one end of which is communicated with the connection groove 50 and the other end of which is terminated at a location adjacent to inclined groove 20 (the notch 11), and a sipe 62, one end of which is communicated with the shoulder inclined groove 40 and the other end of which is terminated at a located adjacent to the inclined groove 30 (the notch 11). Additionally, the shoulder block 20 is provided with a sipe 63, one end of which is communicated with the shoulder inclined groove 40 and the other end of which is terminated at a location adjacent to a zig-zag shaped recess formed from the road contact surface to the side surface of the shoulder block 20. The sipes 61, 62, 63 are each designed such that the end communicated with the groove has a shallow sipe depth. The sipes 60 (sipes 61, 62, 63) as just described are provided, and thus an edge effect by the sipes 60 can be obtained and traction characteristics can be increased. Note that in a case where the depth of each of the sipes 60 is changed in this manner, the sipe 60 may designed such that the sipe depth of a relatively shallow portion is, for example, from 0.1 times to 0.4 times the sipe depth of a relatively deep portion.

Example

Seventeen types of pneumatic tires of Conventional Example 1, Comparative Examples 1 to 3, and Examples 1 to 13 are manufactured. The tire size of each of the tires is LT265/70R17, and the tire has a basic structure illustrated as an example in FIG. 1 and a tread pattern illustrated in FIG. 2 as a base pattern. The angle θa of the first wall with respect to the tire circumferential direction, the angle θb of the second wall with respect to the tire lateral direction, the angle of the third wall with respect to the straight line connecting the end point of the first wall, which is located adjacent to the shoulder block side and the end point of the second wall, which is located adjacent to the shoulder block, a ratio L3/D1 of the length L3 of the third wall to the distance D1 between the end point of the first wall, which is located adjacent to the shoulder block and the end point of the second wall, which is located adjacent to the shoulder block, a positional relationship between the third wall and the midpoint of the line segment connecting the intersection point of the extended line of the first wall with the extended line of the third wall and the intersection point of the extended line of the second wall with the extended line of the third wall, a size relationship between the distance D2 between the third wall and the line segment connecting the end point of the first wall, which is located adjacent to the shoulder block and the end point of the second wall, which is located adjacent to the shoulder block, and the distance D3 between the intersection point of the first wall and the second wall, the wall surface angle of the third wall, and the direction of inclination of the wall surface of the shoulder block, which is connected to the third wall, with respect to the inclined groove in the center region are set out as shown in Tables 1 and 2.

Note that, in the column of "positional relationship between midpoint M and third wall" in Tables 1 and 2, in a case where the third wall and the midpoint M overlap is indicated as "overlapping", and a case where the third wall and the midpoint M are not overlapped is indicated as "non-overlapping". In the column of "inclination direction of wall surface connected to third wall" in Tables 1 and 2, a case where the direction of inclination of the wall surface is opposite to the direction of inclination of the inclined groove is indicated as "opposite", and a case where the direction of inclination of the wall surface is the same as the direction of inclination of the inclined groove is indicated as "same".

Mud performance of the seventeen types of pneumatic tires are evaluated by the following evaluation method and the results are also shown in Tables 1 and 2.

Mud Performance

Test tires are each assembled on a wheel having a rim size of 17×8.0, inflated to an air pressure of 450 kPa, and mounted on a test vehicle (pickup truck), and a sensory evaluation on traction performance and startability is performed by a test driver on mud road surfaces. Evaluation results are expressed as index value with Conventional Example 1 being assigned the index value of 100. Larger index values indicate superior mud performance. Note that when the index value is "105" or greater, it is determined that sufficient mud performance is obtained and when the index value is below "105", it is determined that the evaluation result is insufficient even if there is an improvement in mud performance as compared to Conventional Example 1.

TABLE 1

|  |  | Conventional Example 1 | Comparative Example 1 | Comparative Example 2 | Comparative Example 3 |
|---|---|---|---|---|---|
| Angle θa of first wall |  | 30 | 30 | 15 | 15 |
| Angle θb of second wall |  | 20 | 5 | 20 | 5 |
| Angle of third wall |  | 10 | 3 | 3 | 10 |
| Ratio L3/D1 |  | 1.0 | 0.5 | 0.5 | 0.5 |
| Positional relationship between midpoint M and third wall |  | Overlapping | Overlapping | Overlapping | Overlapping |
| Size relationship between distance D2 and distance D3 |  | D2 < D3 | D2 < D3 | D2 < D3 | D2 < D3 |
| Wall surface angle of third wall |  | 85 | 85 | 85 | 85 |
| Inclination direction of wall surface connected to third wall |  | Opposite | Opposite | Opposite | Opposite |
| Mud performance | Index value | 100 | 102 | 101 | 103 |

|  | Example 1 | Example 2 | Example 3 |
|---|---|---|---|
| Angle θa of first wall | 15 | 0 | 20 |
| Angle θb of second wall | 5 | 0 | 10 |
| Angle of third wall | 5 | 3 | 0 |
| Ratio L3/D1 | 0.5 | 0.5 | 0.5 |
| Positional relationship between midpoint M and third wall | Overlapping | Overlapping | Overlapping |

TABLE 1-continued

|  |  |  |  |  |
|---|---|---|---|---|
| Size relationship between distance D2 and distance D3 |  | D2 < D3 | D2 < D3 | D2 < D3 |
| Wall surface angle of third wall |  | 85 | 85 | 85 |
| Inclination direction of wall surface connected to third wall |  | Opposite | Opposite | Opposite |
| Mud performance | Index value | 106 | 107 | 108 |

|  |  | Example 4 | Example 5 | Example 6 |
|---|---|---|---|---|
| Angle θa of first wall |  | 15 | 15 | 15 |
| Angle θb of second wall |  | 5 | 5 | 5 |
| Angle of third wall |  | 3 | 5 | 5 |
| Ratio L3/D1 |  | 0.2 | 0.3 | 0.8 |
| Positional relationship between midpoint M and third wall |  | Overlapping | Overlapping | Overlapping |
| Size relationship between distance D2 and distance D3 |  | D2 < D3 | D2 < D3 | D2 < D3 |
| Wall surface angle of third wall |  | 85 | 85 | 85 |
| Inclination direction of wall surface connected to third wall |  | Opposite | Opposite | Opposite |
| Mud performance | Index value | 105 | 106 | 106 |

TABLE 2

|  |  | Example 7 | Example 8 | Example 9 | Example 10 |
|---|---|---|---|---|---|
| Angle θa of first wall |  | 15 | 15 | 15 | 15 |
| Angle θb of second wall |  | 5 | 5 | 5 | 5 |
| Angle of third wall |  | 5 | 5 | 5 | 5 |
| Ratio L3/D1 |  | 1.0 | 0.5 | 0.5 | 0.5 |
| Positional relationship between midpoint M and third wall |  | Overlapping | Non-overlapping | Overlapping | Overlapping |
| Size relationship between distance D2 and distance D3 |  | D2 < D3 | D2 < D3 | D2 = D3 | D2 > D3 |
| Wall surface angle of third wall |  | 85 | 85 | 85 | 85 |
| Inclination direction of wall surface connected to third wall |  | Opposite | Opposite | Opposite | Opposite |
| Mud performance | Index value | 105 | 105 | 105 | 105 |

|  |  | Example 11 | Example 12 | Example 13 |
|---|---|---|---|---|
| Angle θa of first wall |  | 15 | 15 | 15 |
| Angle θb of second wall |  | 5 | 5 | 5 |
| Angle of third wall |  | 5 | 5 | 5 |
| Ratio L3/D1 |  | 0.5 | 0.5 | 0.5 |
| Positional relationship between midpoint M and third wall |  | Overlapping | Overlapping | Overlapping |
| Size relationship between distance D2 and distance D3 |  | D2 < D3 | D2 < D3 | D2 < D3 |
| Wall surface angle of third wall |  | 80 | 90 | 85 |
| Inclination direction of wall surface connected to third wall |  | Opposite | Opposite | Same |
| Mud performance | Index value | 106 | 106 | 105 |

As can be seen from Tables 1 and 2, any one of Examples 1 to 13 has improved mud performance as compared to Conventional Example 1. Note that mud performance on mud road surfaces is only evaluated; however, it is revealed that even when traveling on other unpaved roads (a snowy road, a sand area, a rocky area, or the like), the tires of the present technology provide the same function against snow, sand, stones, rocks, or the like on road surfaces as against mud on the mud road surfaces, and thus provide superior driving performance on the unpaved roads.

Meanwhile, in Comparative Examples 1 and 2, since the angle (θa or θb) of the first wall or the second wall is too large, the effect of improving mud performance is not sufficiently obtained. In Comparative Example 3, the angle of the third wall is too large, and the third wall is largely inclined with respect to the opening of the notch. Consequently, the effect of improving mud performance is not sufficiently obtained.

The invention claimed is:

1. A pneumatic tire, comprising:
a tread portion extending in a tire circumferential direction and having an annular shape;
a pair of sidewall portions disposed on opposite sides of the tread portion; and
a pair of bead portions disposed inward of the sidewall portions in a tire radial direction, wherein
a plurality of center blocks are provided in a center region of the tread portion and a plurality of shoulder blocks are provided in shoulder regions of the tread portion,
the center blocks are arranged forming a pair sandwiching an inclined groove that extends inclined with respect to the tire circumferential direction,
one of the pair of the center blocks extends across a tire equator from one side to another side of the tire equator and another of the pair of the center blocks extends across the tire equator from the other side to the one side of the tire equator,
each of the center blocks includes a notch formed of two wall surfaces connected in a V-shape in a tread road contact surface, only a singular bend point being present between the two wall surfaces and being where the two wall surfaces are connected,
the two wall surfaces include, in the tread contact surface, a first wall that extends at an angle within +/−20° with respect to the tire circumferential direction and a second wall that extends at an angle within +/−10° with respect to a tire lateral direction,
each of the shoulder blocks includes a third wall disposed opposed to the notch of the center block, and
the third wall extends at an angle within +/−5° with respect to a straight line connecting an end point P1 of the first wall, which is located adjacent to the shoulder block and an end point P2 of the second wall, which is located adjacent to the shoulder block.

2. The pneumatic tire according to claim 1, wherein the third wall has a length that is from 0.3 times to 0.8 times a distance between the end point P1 of the first wall, which is located adjacent to the shoulder block and the end point P2 of the second wall, which is located adjacent to the shoulder block.

3. The pneumatic tire according to claim 1, wherein the third wall overlaps with a midpoint of a line segment connecting an intersection point p1 of an extended line of the first wall with an extended line of the third wall and an intersection point p2 of an extended line of the second wall with an extended line of the third wall.

4. The pneumatic tire according to claim 1, wherein a distance between the third wall and a line segment connecting the end point P1 of the first wall, which is located adjacent to the shoulder block and the end point P2 of the second wall, which is located adjacent to the shoulder block is smaller than a distance between the line segment connecting the end point P1 of the first wall, which is located adjacent to the shoulder block and the end point P2 of the second wall, which is located adjacent to the shoulder block and an intersection point P3 of the first wall and the second wall.

5. The pneumatic tire according to claim 1, wherein the third wall has a wall surface angle of from 80° to 90°.

6. The pneumatic tire according to claim 1, wherein of wall surfaces configuring the shoulder block, an inclination direction in the tread road contact surface of the wall surfaces which are connected to the third wall is opposite to an inclination direction of the inclined groove.

7. The pneumatic tire according to claim 2, wherein the third wall overlaps with a midpoint of a line segment connecting an intersection point p1 of an extended line of the first wall with an extended line of the third wall and an intersection point p2 of an extended line of the second wall with an extended line of the third wall.

8. The pneumatic tire according to claim 7, wherein a distance between the third wall and a line segment connecting the end point P1 of the first wall, which is located adjacent to the shoulder block and the end point P2 of the second wall, which is located adjacent to the shoulder block is smaller than a distance between the line segment connecting the end point P1 of the first wall, which is located adjacent to the shoulder block and the end point P2 of the second wall, which is located adjacent to the shoulder block and an intersection point P3 of the first wall and the second wall.

9. The pneumatic tire according to claim 8, wherein the third wall has a wall surface angle of from 80° to 90°.

10. The pneumatic tire according to claim 9, wherein of wall surfaces configuring the shoulder block, an inclination direction in the tread road contact surface of the wall surfaces which are connected to the third wall is opposite to an inclination direction of the inclined groove.

* * * * *